United States Patent
Hiraoka et al.

(10) Patent No.: US 9,016,354 B2
(45) Date of Patent: Apr. 28, 2015

(54) METHOD FOR COOLING A HUMID GAS AND A DEVICE FOR THE SAME

(75) Inventors: Satoshi Hiraoka, Hyogo (JP); Koichi Inoue, Fukuoka (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 1599 days.

(21) Appl. No.: 12/263,872

(22) Filed: Nov. 3, 2008

(65) Prior Publication Data
US 2010/0108301 A1 May 6, 2010

(51) Int. Cl.
| | |
|---|---|
| F28B 1/00 | (2006.01) |
| F28B 3/00 | (2006.01) |
| F28B 9/10 | (2006.01) |
| F28D 7/00 | (2006.01) |
| F02M 23/14 | (2006.01) |
| F28D 5/02 | (2006.01) |
| F02C 7/143 | (2006.01) |
| F28D 7/16 | (2006.01) |
| F28F 17/00 | (2006.01) |

(52) U.S. Cl.
CPC . *F28D 5/02* (2013.01); *F02C 7/143* (2013.01); *F28D 7/1638* (2013.01); *F28F 17/005* (2013.01)

(58) Field of Classification Search
CPC ........ F28D 7/1638; F28D 5/02; F02C 7/1435
USPC .......... 165/112–118, 144, 145, 153; 261/152, 261/155, 156
See application file for complete search history.

(56) References Cited

U.S. PATENT DOCUMENTS

| | | | | |
|---|---|---|---|---|
| 658,899 A * | 10/1900 | Pownall | .......... | 165/116 |
| 764,541 A * | 7/1904 | Alberger | .......... | 165/114 |
| 828,060 A * | 8/1906 | Schwager | .......... | 165/118 |
| 1,372,409 A * | 3/1921 | Ehrhart | .......... | 261/118 |
| 1,808,619 A * | 6/1931 | Uhde | .......... | 165/83 |
| 1,810,375 A * | 6/1931 | Smith | .......... | 165/114 |
| 2,051,185 A * | 8/1936 | Stalcup | .......... | 62/170 |

(Continued)

FOREIGN PATENT DOCUMENTS

| | | |
|---|---|---|
| JP | 53-135854 U | 4/1977 |
| JP | 55-73783 U | 11/1978 |

(Continued)

OTHER PUBLICATIONS

Machine Translation of JP05-010960.*

(Continued)

*Primary Examiner* — Alexandra Elve
*Assistant Examiner* — Paul Alvare
(74) *Attorney, Agent, or Firm* — Westerman, Hattori, Daniels & Adrian, LLP

(57) ABSTRACT

Cooling performance of a cooler for pre-cooling humid gas supplied to a gas turbine power generation plant, etc. is improved by increasing heat transfer efficiency between the humid gas and cooling liquid flowing in heat exchanger tubes with utilization of condensed liquid generated due to the cooling of the humid gas. In a heat exchanger for cooling humid gas a flowing surrounding heat exchanger tubes 8 of the tube groups 9a and 9b by flowing cooling liquid r in the tubes, the liquid droplets cl generated by condensation of moisture contained in the humid gas are gathered and sprinkled or fallen in drops on a part of the heat exchanger tube group 9b, which results in increased heat exchange efficiency.

3 Claims, 9 Drawing Sheets

(56) References Cited

U.S. PATENT DOCUMENTS

| | | | |
|---|---|---|---|
| 2,812,164 A * | 11/1957 | Thompson | 165/110 |
| 3,292,998 A * | 12/1966 | James | 423/655 |
| 3,967,677 A * | 7/1976 | Mohlman | 165/162 |
| 4,193,443 A * | 3/1980 | Nanaumi et al. | 165/66 |
| 4,353,217 A * | 10/1982 | Nishioka et al. | 60/693 |
| 4,974,669 A * | 12/1990 | Nagel | 165/111 |
| 5,509,466 A * | 4/1996 | McQuade et al. | 165/113 |
| 5,638,695 A * | 6/1997 | Kamio et al. | 62/279 |
| 5,893,410 A * | 4/1999 | Halbrook | 165/118 |
| 6,276,442 B1 * | 8/2001 | Rasmussen | 165/110 |
| 6,857,462 B2 * | 2/2005 | Sasaoka et al. | 164/113 |
| 6,948,558 B2 * | 9/2005 | Maisotsenko et al. | 165/110 |
| 8,171,749 B2 * | 5/2012 | Lu et al. | 62/291 |
| 2004/0003619 A1 * | 1/2004 | Lee et al. | 62/305 |

FOREIGN PATENT DOCUMENTS

| | | | |
|---|---|---|---|
| JP | 57-65525 | | 4/1982 |
| JP | 58-64487 A | | 4/1983 |
| JP | 4-104879 A | | 4/1992 |
| JP | 5-10960 U | | 2/1993 |
| JP | 11-36887 A | | 2/1999 |
| JP | 11036887 A | * | 2/1999 |
| JP | 2000-161081 A | | 6/2000 |
| JP | 2003-279215 A | | 10/2003 |

OTHER PUBLICATIONS

Machine Translation of JP11-036887.*

Machine Translation of JP2003-279215.*

Translation of Japanese publication JP 11036887 A named TRANS-JP11036887A.*

Japanese Office Action dated Oct. 27, 2011, issued in corresponding Japanese Patent Application No. 2007-089791, with English Translation.

Japanese Office Action dated May 18, 2012, issued in corresponding Japanese Patent Application No. 2007-089791, with English translation (6 pages).

* cited by examiner

Cooling effect of the air is bigger

Cooling effect of the air is smaller

A cross section along line A - A

A cross section along line B - B

PRIOR ART

METHOD FOR COOLING A HUMID GAS AND A DEVICE FOR THE SAME

BACKGROUND OF THE INVENTION

1. Field of the Invention

The present invention relates to a method and apparatus for pre-cooling humid gas to be supplied to an electric power plant as air for combustion or gasification of coal, with which heat transfer between the humid gas and cooling liquid in the heat exchanger tubes of the apparatus is increased resulting in improved heat exchange performance due to increased heat transfer efficiency.

2. Description of the Related Art

In gas turbine power plants, air compressed by a compressor is mixed with fuel and burnt in a combustor, and the high temperature combustion gas is introduced to a turbine to rotate it. Therefore, the air to be supplied to the compressor and mixed with the fuel is desirable to be large in specific weight in order to increase turbine output. The lower the temperature of air is, the larger the specific weight of air is. Therefore, air to be used in a gas turbine is desirable to be lower in temperature.

In production equipment of air for coal gasification to supply air to a coal gasification furnace in a compound power plant with coal gasification equipment, air for coal gasification is obtained by extracting a part of compressed air in compression process in the compressor of the turbine. In this case, also the extracted compressed air is cooled by a cooler to increase specific weigh thereof, thereby decreasing power required to supply the air. For example, cooling water of 30° C. is supplied as a cooling liquid to the cooler and compressed air of few hundred degrees (about 200° C. for example) is cooled to 50~60° C. by the cooler. The cooling water rises in temperature to about 40° C. at the outlet of the cooler.

In patent literature (Japanese Laid-Open Patent Application No. 11-36887) is disclosed a suction air cooler having a number of heat exchanger tubes to cool the suction air. Construction of this air cooler will be explained referring to FIG. 11. In FIG. 11, suction air 010 is introduced from a suction air inlet 01 of a suction air cooler 02. A damper room 03, a suction air filter room 04, and a suction air duct 05 are connected to the cooler 02 so that cooled air is introduced to a compressor 07 of a turbine 06.

The suction air cooler 02 has banks of heat exchanger tubes 09 consisting of a number of heat exchanger tubes 08 arrange therein. Heat exchange is performed between a cooling liquid flowing in the heat exchanger tubes 08 and the suction air 010 flowing in the cooler while contacting the outer surfaces of the heat exchanger tubes 08 to cool the suction air. A drain pipe 011 is provided at the bottom of the suction air cooler 02 to drain water droplets generated by condensation of moisture in the suction air 010 and fallen down onto the bottom of the cooler 02. A plurality of dampers 012 are provided in the damper room 03 and the air stream is changed in accordance with whether the turbine is in an operation or halt.

A suction air filter 013 is provided in the suction air filter room 04 to remove dust contained in the suction air and cleaned air 010a is supplied to the compressor 07 of the turbine 06. The cooling liquid to be flowed in the heat exchanger tubes 08 is cooled by a refrigerating machine not shown in the drawing.

A plurality of trays 021 (two trays in FIG. 11) are provided to partition the banks of heat exchanger tubes 09 into several groups (three groups in FIG. 11) of heat exchanger tubes 08, and the trays 021 are inclined downward toward downstream of the suction air.

With this configuration, the suction air 010 flows through the space between the heat exchanger tubes 08 arranged in the suction air cooler 02 and is cooled by cooling liquid flowing in the tubes 08. Moisture in the suction air condenses and forms water droplets 019 on the outer surfaces of the tubes 08. The droplets gradually grow and fall down by their own gravity on to the trays 021. The water droplets 08 fallen down on the trays 021 flow down on the surfaces of the inclined tray 021 and then fall down from the downstream side end of each of the trays 021.

With this cooler, the water droplets condensed on the outer surfaces of the heat exchanger tubes 08 of each of the groups are gathered on the inclined trays 021 located below the tubes 08 of each group to fall down from the ends thereof and to form a kind of water droplet curtain 019a and are scattered so that they are contacted with the suction air flowing across the kind of water droplet curtain 019a in order to increase efficiency of trapping dust contained in the suction air. In this way, the water droplets 08 is allowed to perform subsidiary dust control effect for the suction air filter 013, thereby attaining long operation life and compactness of the suction air filter 013.

In patent literature 2 (Japanese Laid-Open Patent Application No. 2000161081) is disclosed an air suction device for a compressor of a gas turbine generator. The suction device is composed of a cylindrical air suction duct connecting to the inlet of the compressor. In the suction duct is provided a water spraying section, an air cooler, and an eliminator sequentially along suction air flow in the duct. A drain recovery and recycle section is provided outside the suction duct. The suction air is deprived of impure substance such as salt and sulfur content contained therein by spraying water in the water spraying section provided upstream of the air cooler and then cooled by the air cooler. Water droplets condensed on the outer surface of the heat exchanger tubes of the air cooler fall down and gathered to be reused as a part of water to be sprayed in the water spraying section. In this way, the suction air is cleaned in the water spraying section and then cooled by the air cooler only when temperature of the suction air is high in summer season.

The device disclosed in the patent literature 1 aims to increase trapping efficiency of dust contained in the suction air by utilizing water droplets condensed on the outer surfaces of the heat exchanger tubes and not intends to utilize the water droplets to increase heat transfer through the heat exchanger tubes.

With the device disclosed in the patent literature 2, water droplets condensed on the outer surfaces of the heat exchanger tubes are used as a part of water to be sprayed in the water spraying section to clean the suction air and not intends to utilize the water droplets to increase heat transfer through the heat exchanger tubes.

SUMMARY OF THE INVENTION

The present invention was made in light of problems of prior art, and the object of the invention is to improve cooling performance of cooling humid gas through increasing efficiency of heat transfer between the humid gas and cooling liquid flowing in heat exchange tubes in a heat exchanger for pre-cooling humid gas, etc. supplied to a power generation plant to be used for combustion or gasification of coal by utilizing condensed liquid generated due the cooling of the humid gas.

To attain the object, the invention proposes a method of cooling humid gas in a heat exchanger through heat exchange between the humid gas flowing outside of heat exchanger tubes of a group or groups and cooling liquid flowing in the heat exchanger tubes, wherein liquid condensed from moisture in the humid gas by condensation is gathered and the gathered liquid is sprinkled or allowed to fall in drops on a part of the tube group or on a part of one of the tube groups thereby increasing heat exchange performance.

The invention proposes as a first invention of apparatus A heat exchanger comprising a casing and heat exchanger tubes arranged inside the casing to cool humid gas through heat exchange between the humid gas flowing in the casing and cooling liquid flowing in the heat exchanger tubes, wherein the heat exchanger tubes are arranged as a tube group or tube groups in the casing, a means for gathering condensed liquid generated by condensation of moisture in the humid gas is provided, and a means for allowing the gathered liquid to be sprinkled or fallen in drops on a part of the tube group or part of at least one of the tube groups so that films of the condensed liquid are formed on surfaces of said part of the heat exchanger tubes.

A second invention of apparatus of the invention is a heat exchanger comprising a casing and heat exchanger tubes arranged inside the casing to cool humid gas through heat exchange between the humid gas flowing in the casing and cooling liquid flowing in the heat exchanger tubes, wherein the heat exchanger tubes are arranged as a tube group or tube groups in the casing, and a means for allowing cooling liquid to be sprinkled or fallen in drops on a part of the tube group or part of at least one of the tube groups so that films of the liquid are formed on surfaces of said part of the heat exchanger tubes.

In air coolers installed in gas turbine power generation plants etc., atmospheric air is cooled. Therefore, condensed water is generated by condensation of moisture in the atmospheric air when it is cooled.

The inventors of the invention performed experiments concerning cooling of humid gas under high pressure, supposing an air cooler used in coal gasification air production equipment to supply air for coal gasification furnace, for it is expected that influence of behavior of condensed water in the air cooler to heat transfer characteristic between air and cooling liquid becomes conspicuous in cooling of humid gas under high pressure.

In the experiment was performed using a heat exchanger having heat exchanger tube groups as written-in in FIG. 1. Humid gas of pressure of 0.9 Mpa (temperatures at the inlet: 60~120° C.) is flown down at a flow rate of 500 kg/h as indicated by a bold arrow. Flow rates of cooling liquid in the heat exchanger tubes were $(144~288) \times 10^{-3}$ m$^3$/h and inlet temperature thereof was 40° C. A result of experiment is shown in FIGS. 1 and 2.

$W_{in}$ in FIG. 1 is absolute humidity of the humid gas at the inlet to the cooler. FIG. 1 is a result when humid gas of $W_{in}$=0.050 (kg water vapor/kg dry air) was introduced. Qci/Qci, analogy is plotted against section i, wherein section i indicates section number in the heat exchange range numbered from upper section downward sequentially as written-in in FIG. 1, Qci is heat quantity exchanged in each section between the humid gas and the cooling water flowing in the heat exchanger tubes calculated from temperature rise of cooling water in each section, and Qci, analogy is heat exchange quantity between dry air and the cooling water calculated based on an assumption that analogical heat transfer occurs between the dry air and the cooling water using prediction relation of heat transfer in case of dry air and that inlet condition of dry air and cooling water is the same as that in the case of the humid gas.

It is recognized from FIG. 1 that Qci/Qci, analogy is increased in heat exchanger tubes in lower sections as compared with that in the upper section.

FIG. 2 shows Qc/Qc, analogy, where Qc is total heat quantity exchanged all sections from section 1 to 4, that is, a sum of Qc1i~Qc4i and Qc, analogy is a sum of Qc1, analogy~Qc4, analogy, and $m_d$ is water quantity condensed per unit time. It is recognized from FIG. 2 that Qc/Qc, analogy increases with increase of $m_d$ though the data somewhat scatter. It is thought this means that effect of increased heat transfer and substantially increased heat transfer area due to ripples formed on condensed water adhered to the surfaces of the heat exchanger tubes was large.

Based on the finding, condensed liquid generated due to condensation of moisture in humid gas by cooling the humid gas in a region or regions of exchanging heat between the humid gas and cooling liquid via heat exchanger tubes, is gathered and allowed to be sprinkled or fallen in drops in a part of the heat exchange region in the method and the apparatus of the first invention, and in the apparatus of the second invention the cooling water is allowed to be sprinkled or fallen in drops in a part or all of the heat exchange region, by which net surface area of heat transfer between the droplets of condensed liquid and humid gas is increased and heat exchange performance is improved.

Further, in the method and the apparatuses of the first and second invention, heat exchange performance is increased by forming liquid films on a part of surfaces of the heat exchange tubes with the condensed liquid or the cooling water sprinkled or fallen in drops on that part.

In the method and the apparatus of the first invention, when the condensed liquid is gathered and sprinkled or fallen in drops in a part of heat exchange region, the condensed liquid is cooled below dew point temperature and falls down in a state of super-cooled liquid to forms super-cooled liquid films on surfaces of the heat exchanger tubes. Therefore, the humid gas can be cooled by sensible heat exchange with the super-cooled liquid with which the humid gas contacts until the super-cooled liquid is heated by the humid gas to a dew point temperature in the humid gas, then the humid gas is further cooled deprived of heat by evaporation of the liquid which reached the dew point temperature, which is referred to as latent heat exchange. The humid gas can be thus further cooled by the latent heat exchange.

As sensible heat exchange and latent heat exchange are performed between the surfaces of the liquid films and the humid gas contacting thereto in this way, performance of cooling of humid gas can be increased as compared with a case fluid films are not formed on surfaces of heat exchanger tubes. This is true in the case of the apparatus of the second invention when liquid films are formed with the cooling water sprinkled or fallen in drops on the heat exchanger tubes. In the apparatus of the second invention, the cooling liquid from outside systems is sprinkled or fallen in drops instead of condensed liquid. Therefore, flow amount and temperature are not restricted as are in the case of sprinkling condensed liquid.

Accordingly, desired cooling performance can be achieved by controlling amount and temperature of cooling liquid from outside systems.

Furthermore, ripples are formed on the liquid films formed on the surface of the heat exchanger tubes in accordance with thickness of the liquid film or due to turbulence, etc. of the humid gas occurred around the liquid film. Net area of heat transfer of the fluid film is increased due to the formation of the ripples, and heat transfer performance is further increased.

In the apparatuses of the first and second invention, it is preferable that the heat exchanger is of counterflow type. By this, large temperature difference between the humid gas and cooling liquid can be secured along the entire heat exchange region and heat exchange amount can be increased It is preferable that the liquid films of condensed liquid or cooling water are formed on surfaces of the heat exchanger tubes in a region thereof near an inlet of the humid gas into or from the casing of the cooler.

Heat transfer between the liquid films and humid gas is more significant when the liquid films are formed on the tubes in the region near the humid gas inlet. Humid gas high in temperature and low in relative humidity is flowing neat the inlet, so temperature difference between the humid gas and liquid films, and heat exchange between the humid gas and the liquid films is enhanced.

In the apparatus of the first invention, it is preferable to compose the heat exchanger such that the heat exchanger is a horizontal type one, inside of the casing is divided into an upper and a lower heat exchange region by a partition plate with an opening provided for allowing communication between the upper and lower heat exchange regions. A cooling liquid inlet and a cooling liquid outlet are provided such that the cooling liquid is first introduced to the heat exchanger tubes of the upper tube group to flow in a direction toward the opening communicating the upper and lower heat exchange regions and then introduced to the heat exchanger tubes of the lower tube group to flow in a direction opposite to that in the tubes of the upper tube group, a humid gas inlet is provided in the casing at apart adjacent to the cooling liquid outlet and a humid gas outlet is provided in the casing at a part adjacent to the cooling liquid inlet, and said partition plate is inclined downward from said opening toward the humid gas inlet and outlet side and a number of small holes are made in the partition plate in a range above said air inlet, whereby liquid generated by condensation of moisture contained in the humid gas in the upper heat exchange region is received on the partition plate and flows thereon toward a liquid sparkling zone where are many small holes to sprinkle or drop to a part of the heat exchanger tubes in a region above the air inlet and below the holes.

With the composition, condensed liquid generated in the upper heat exchange region is received on the partition plate, and the liquid received thereon is gathered the region where the small holes are bored. The condensed liquid is allowed to be sprinkled through the small holes by its own gravity on the heat exchanger tubes at a region above the humid gas inlet. In this way, liquid film of condensed liquid can be formed on surfaces of the heat exchanger tubes in the region where humid gas of high temperature and low relative humidity by simply providing a partition plate having small holes between the upper and lower group of the heat exchanger tubes.

In the apparatus of the first invention, it is applicable to compose the heat exchanger such that the heat exchanger is counter flow type and an upright-mounted one, a cooling liquid inlet and a cooling liquid outlet are provided such that the cooling liquid is introduced to the heat exchanger tubes from lower ends thereof to flow up therein and discharged from upper ends thereof, a humid gas inlet and outlet are provided at an upper and lower part respectively of the casing, a plurality of baffle plates are provided inside the casing at a proper spacing such that an opening is formed between an end of each baffle plate and the inside surface of the casing, on the other hand, the other end of them connecting to the inside surface so that the humid gas introduced from the humid gas inlet flows down snaking in the casing. Each of the baffle plates except a lowest positioned one being inclined toward the opening so the condensed liquid generated from moisture contained in the humid gas received on each of the baffle plates flows on the surface thereof and flows down through the openings, and the lowest positioned baffle plate is provided horizontally at a position upper than the gas outlet in the casing and has a number of small holes, whereby liquid generated by condensation of moisture contained in the humid gas fallen down on the lowest baffle plate is allowed to be sprinkled or fallen in drops through the small holes and liquid films are formed on surfaces of the heat exchanger tubes in a region below the lowest positioned baffle plate.

With the composition, condensed liquid generated in the upper heat exchange region of the upright heat exchanger falls down by its own gravity guided by each of the baffle plates to be received on the lowest baffle plate in which a number of small holes are made. The condensed liquid is allowed to be sprinkled or fallen in drops through the small holes by its own gravity, and liquid films are formed on surfaces of the heat exchanger tubes in the region below the lowest baffle plate.

With this composition, the humid gas flow down from the gas inlet at the upper part of the casing toward the gas outlet at the bottom part of the casing while the humid gas is decreasing in temperature gradually, therefore decreasing in specific volume and increasing in specific gravity, so the humid gas flow can be promoted by the action of gravity.

In the apparatus of the first invention, it is applicable to compose the heat exchanger such that the heat exchanger is an upright-mounted one, inside of the casing is divided into a left and a right heat exchanger region by an upright partitioning plate with a top side opening provided for allowing communication between the left and right heat exchange regions.

A cooling liquid inlet and a cooling liquid outlet are provided such that the cooling liquid is first introduced to the heat exchanger tubes of one of both tube groups from lower ends thereof to flow up in the tubes and then introduced to the heat exchanger tubes of the other one of both tube groups from upper ends thereof to flow down in the tubes. A humid gas inlet is provided in the casing at a part adjacent to the cooling liquid outlet and a humid gas outlet is provided in the casing at a part adjacent to the cooling liquid inlet. A plurality of baffle plates are provided inside the casing at a proper spacing such that the humid gas introduced from the humid gas inlet flows up snaking in one of heat exchange region and then flows down snaking in the other one of the heat exchange region to be discharged from the humid gas outlet, that flow direction of the humid gas is opposite to that of the cooling liquid, and that liquid generated by condensation of moisture contained in the humid gas falls down by way of the upper surfaces of the baffle plates positioned above a lowest positioned baffle plate which is provided at a position slightly upper than the humid gas inlet, and a number of small holes are made in the lowest positioned baffle plate.

Whereby the liquid received on the lowest positioned baffle plate provided at a position slightly above the humid gas inlet is allowed to be sprinkled or fallen in drops through the holes and liquid films are formed on surfaces of a part of the heat exchanger tubes in a region below the lowest positioned baffle plate.

With the composition, the heat exchange region is formed to extend vertically as is in the above-mentioned heat exchanger, and condensed liquid generated in the heat exchange region is falls down by its own gravity and is received on the lowest positioned baffle plate. As the condensed liquid received on the lowest positioned baffle plate is allowed to be sprinkled or fallen in drops through the small holes of the lowest baffle plate on the heat exchanger tubes at a part in a region below the lowest baffle plate near the humid gas inlet where humid gas of highest temperature flows in, temperature difference between the humid gas and the liquid films formed on surfaces of the heat exchanger tubes is large, so amount of heat exchange there can be increased.

In the apparatus of the first invention, it is applicable to compose the heat exchanger such that the heat exchanger consists of a plurality of horizontal heat exchanger arranged above and below. The cooling liquid outlet of an upper heat exchanger is connected to a cooling liquid inlet of a lower heat exchanger disposed under the upper one via a connecting pipe and the humid gas outlet of the lower heat exchanger is connected to the humid gas inlet of the upper one via a connecting pipe. The lower heat exchange region of the upper heat exchanger is connected to the upper heat exchange region of the lower heat exchanger via a connecting pipe so that liquid generated from moisture contained in the humid gas by condensation flowing in the upper heat exchanger is introduced to the upper heat exchange region of the lower heat exchanger, a tray having a number of small holes is provided in the upper heat exchange region of the lower heat exchanger below a condensed liquid inlet above the opening communicating the upper heat exchange region to the lower heat exchange region of the lower exchanger.

Whereby the liquid received on the tray is allowed to be sprinkled or fallen in drops through the holes and liquid films are formed on surfaces of a part of the heat exchanger tubes in a region below the tray.

Even if plurality of heat exchangers required, the heat exchanger for realizing this invention can be composed easily by arranging a plurality of horizontal heat exchangers above and below and connecting an upper heat exchanger with a lower heat exchanger by connecting pipes as described above. All of condensed liquid generated in the upper heat exchanger is introduced into the lower heat exchanger disposed under the upper heat exchanger, so condensed liquid can be sprinkled on the heat exchanger tubes over a wide range in the lower heat exchanger and liquid films can be formed on surfaces of the tubes over a wide range. Therefore, cooling effect of cooling humid gas is increased remarkably as compared with a case of single heat exchanger.

According to the method and the apparatus of the first invention, a film of condensed liquid is formed on at least a part of the surface of each heat exchanger tube by gathering condensed liquid generated by cooling humid gas and allowing the gathered condensed liquid to be sprinkled or fallen in drops, so net heat transfer area between the sprinkled condensed liquid and humid gas can be increased and heat transfer coefficient is increase by the formation of the liquid films on surfaces of the heat exchanger tubes, and as a result performance of cooling humid gas can be improved.

According to the apparatus of the second invention, cooling water is sprinkled or fallen in drops and liquid films of the cooling water are formed on at least a part of the surfaces thereby, so net heat transfer area between the sprinkled condensed liquid and humid gas can be increased and heat transfer coefficient is increase by the formation of the liquid films on surfaces of the heat exchanger tubes, and as a result performance of cooling humid gas can be improved. Furthermore, quantity and temperature of the cooling water to be sprinkled can be controlled freely, so desired cooling performance can be achieved.

DETAILED DESCRIPTION OF THE PREFERRED EMBODIMENTS

The present invention will be detailed hereunder based on several embodiments with reference to accompanying drawings. It is intended, however, that unless particularly specified, dimensions, materials, relative positions and so forth of the constituent parts in the embodiments shall be interpreted as illustrative only not as limitative of the scope of the present invention.

[The First Embodiment]

Figure 1:
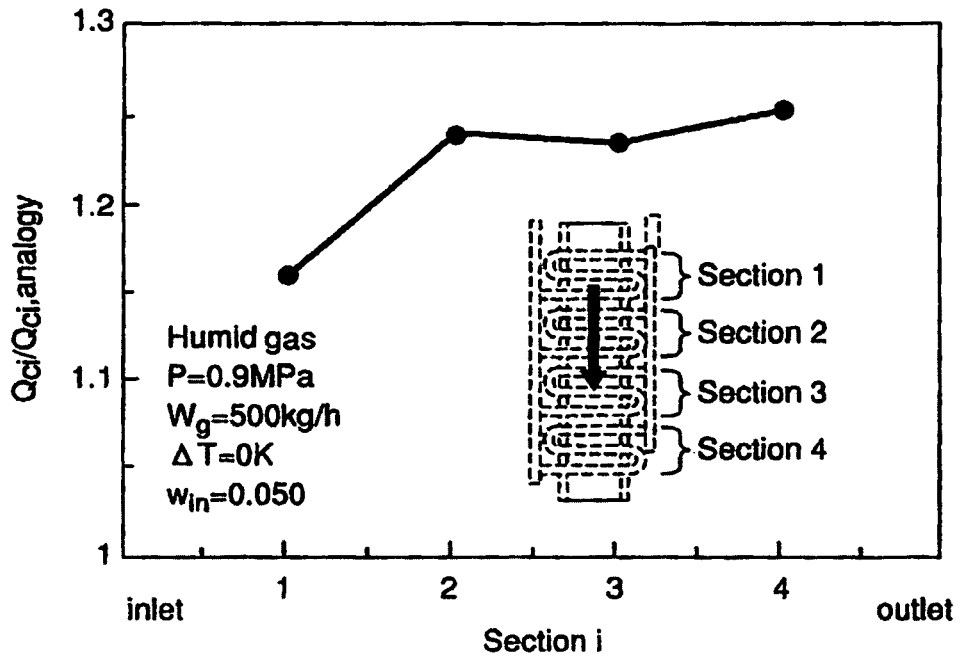
FIG. 1 is a result of experiment showing improvement of heat exchange performance by forming liquid films on surfaces of the heat exchanger tubes.
Figure 2:
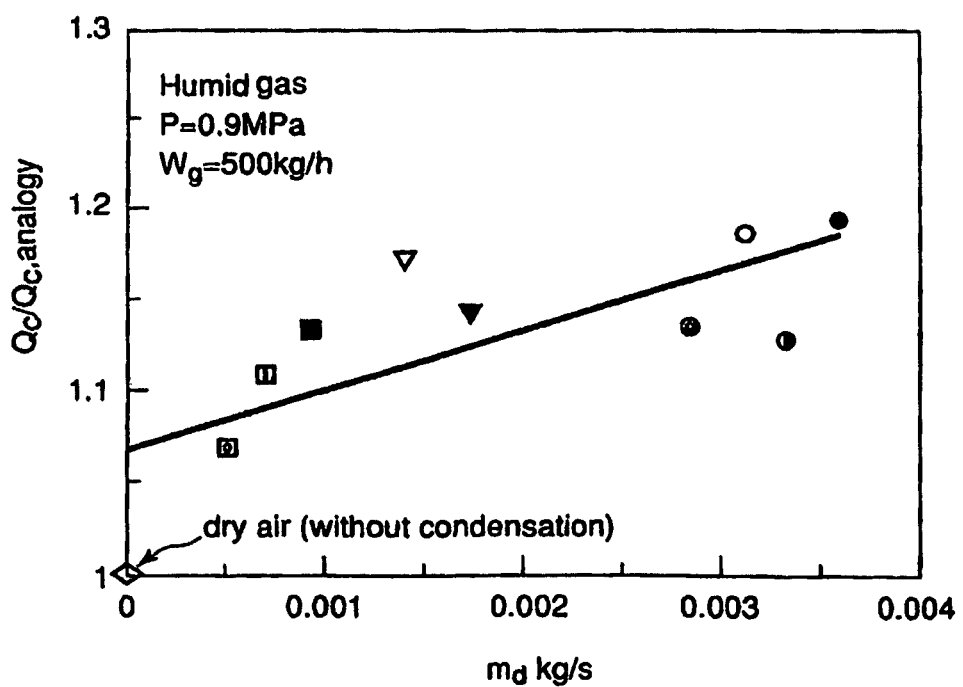
FIG. 2 is a result of experiment showing increase in improvement with increase in water quantity condensed per unit time.
Figure 3:
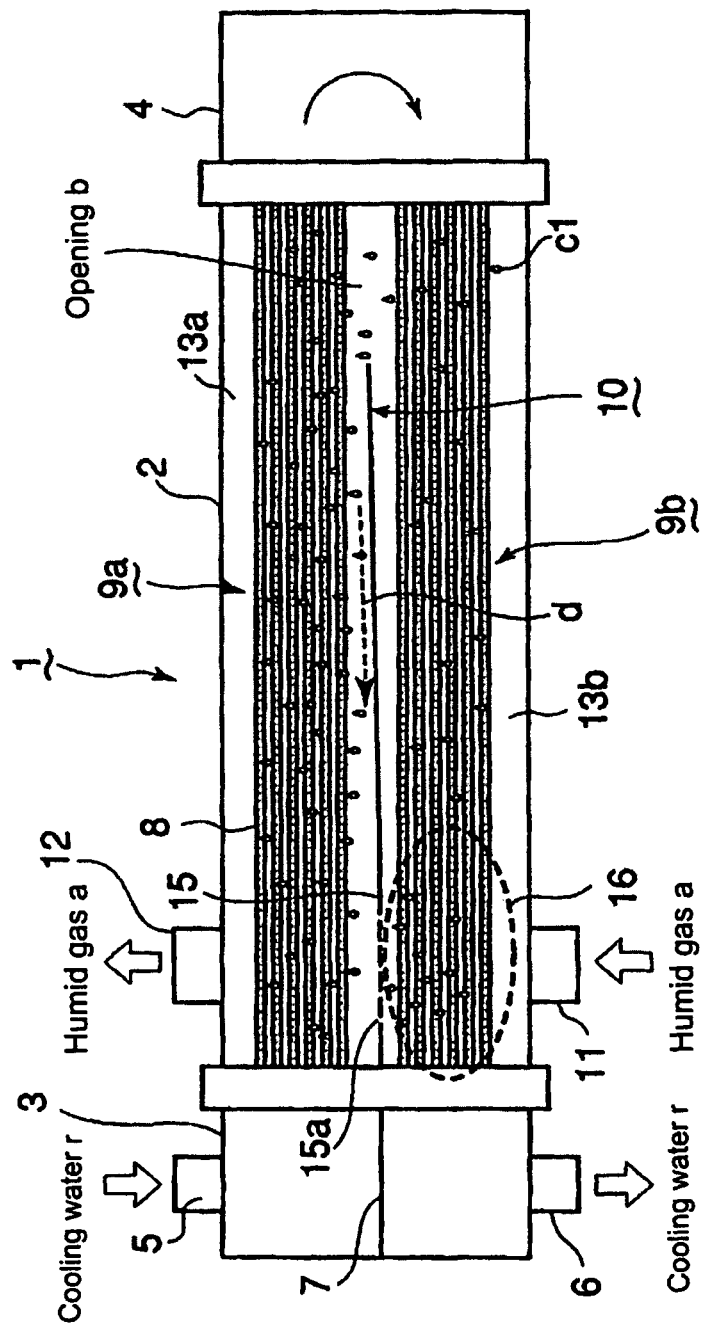
FIG. 3 is a humid gas cooler of the first embodiment of the invention represented with heat exchanger tubes revealed.
Figure 4A:
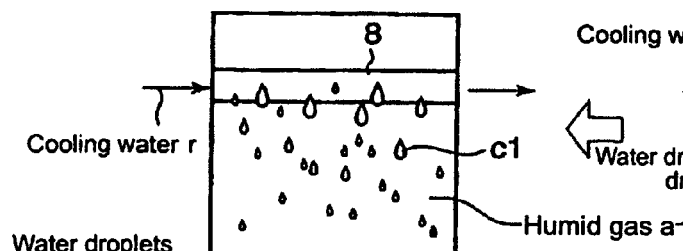
FIG. 4(a) is a drawing for explaining cooling effect of the humid gas cooler of the invention.
Figure 4B:
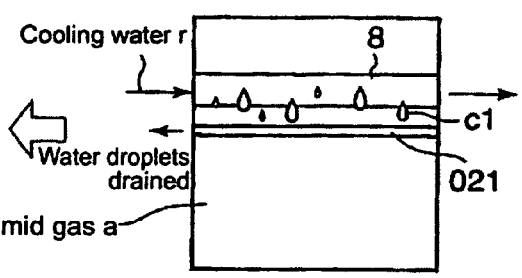
FIG. 4(b) is for explaining cooling effect of the suction air cooler of the patent literature 1.
Figure 5A:
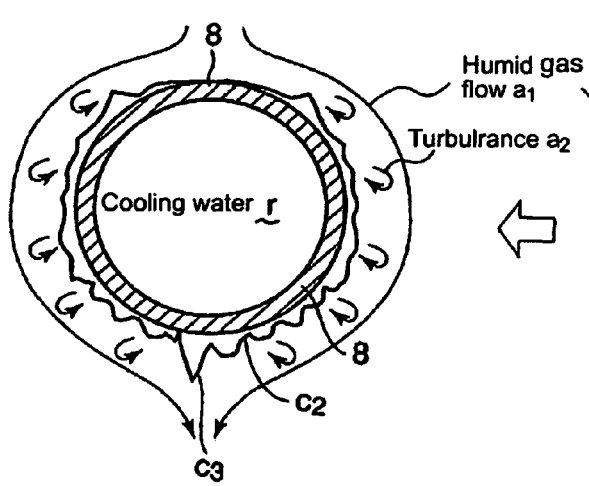
FIG. 5(a) is a drawing showing formation of a liquid film on the outer surface of a heat exchanger tube in cross section in the present invention.
Figure 5B:
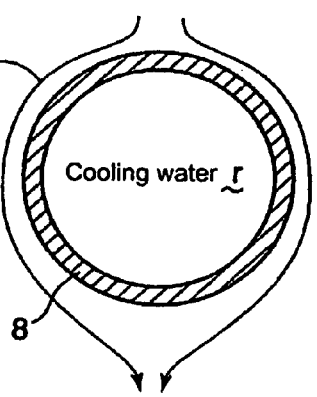
FIG. 5(b) is a drawing showing when liquid film is not formed on the outer surface of a heat exchanger tube in cross section.

A first embodiment of the present invention will be explained with reference to FIGS. 3-5. FIG. 3 shows the first embodiment of the humid gas cooler used in gas turbine power generation plant or compound power plant with coal gasification equipment in elevation partly cut to reveal heat exchanger tubes. FIG. 4(a) is a drawing for explaining cooling effect of the humid gas cooler of the invention, and FIG. 4(b) is for explaining cooling effect of the suction air cooler of the patent literature 1. FIG. 5(a) is a drawing showing formation of a liquid layer on the outer surface of a heat exchanger tube in cross section in the present invention, and FIG. 5(b) is a drawing showing when liquid layer is not formed on the outer surface of a heat exchanger tube in cross section.

Referring to FIG. 3, the air cooler of the first embodiment 1 has a casing 2 and a left and light header 3, 4 attached to both left and right end plates of the casing 2. Inside of the left header 3 is divided in two rooms, an upper room and a lower room, by a partition plate 7. The upper room is provided with a water inlet 5 and the lower room is provided with a cooling water outlet 6. Inside spaces of the left and right headers 3 and 4 are communicated to inside spaces of a number of heat exchanger tubes 8 arranged horizontally inside the casing 2 with both ends thereof connected to both the end plates.

The heat exchanger tubes 8 are divided in two groups, an upper group of heat exchanger tubes 9a and a lower group of heat exchanger tubes 9b. A partition plate 10 is provided between the upper tube group 9a and the lower tube group 9b to divide the inside space of the casing 2 into an upper heat exchange region 13a and a lower heat exchange region 13b. The regions 13b communicate to the region 13a via a opening between the right end of the partition plate 10 and the right end plate of the casing 2. The partition plate 10 is inclined downward toward left header 3. It also serves as a tray to receive water droplets fallen from the outer surfaces of the upper tube group 9a.

The cooling water r is introduced from the water inlet 5 to the upper room of the left header 3, flows through the upper tube group 9a in the upper heat exchange region 13a to enter the right header 4, then flows through the lower tube group 9b in the lower heat exchange region 13b to enter the lower room of the left header 3 to be drained from the outlet 6.

Humid gas to be cooled enters the lower heat exchange region 13b through an air inlet 11 at a lower left end part of the casing 2, flows rightward in the lower heat exchange region 13b along the lower tube group 9b, enters the upper heat exchange region 13a, through the opening b, then turn to the left and flows in the upper heat exchange region 13a along the upper tube group 9a to be discharged from the cooler 1.

Heat exchange is performed between the cooling water r flowing in the heat exchanger tubes 8 and the humid gas a in the upper and lower heat exchange region 13a and 13b, and the humid gas a is cooled.

The leftward inclined partition plate 10, which also serves as a tray, has a number of small holes 15a in a water sprinkling zone 15 above an air inlet region 16 above the inlet opening of the air inlet 11.

When the humid gas a is cooled by heat exchange with the cooling water r in the upper and lower heat exchange region 13a and 13b, moisture contained in the humid gas condenses on the outer surfaces of the heat exchanger tubes 8 and the condensed water drops down in a shape of a number of water droplets c1.

Figure 11:
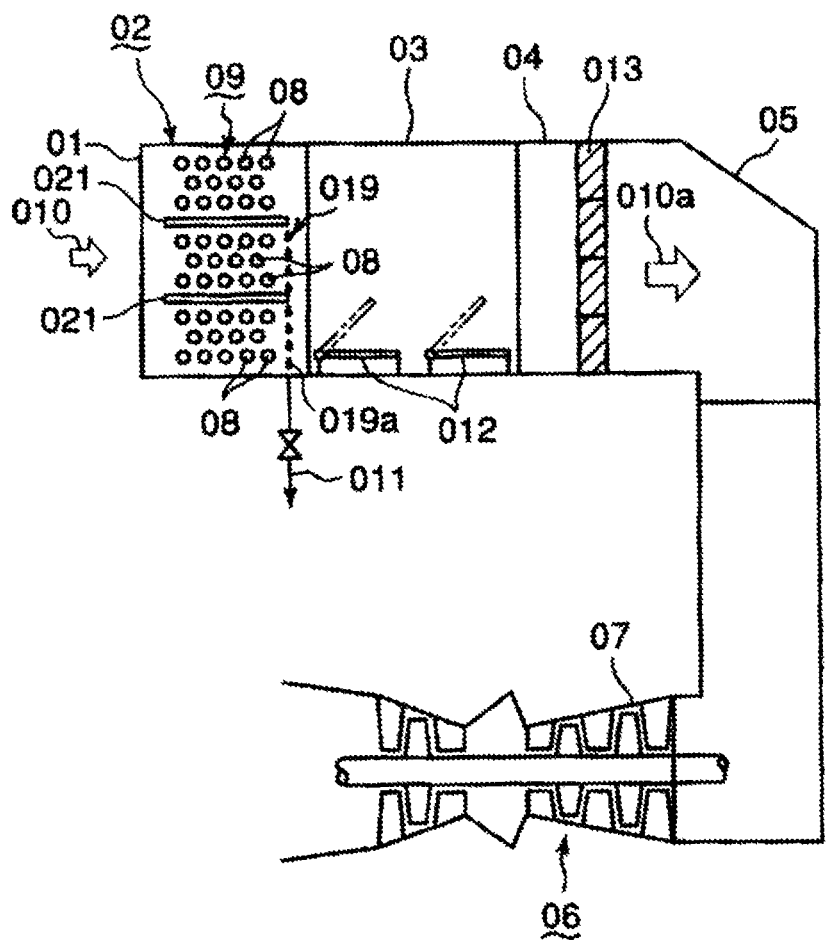
FIG. 11 is a schematic sectional view of a suction air cooler disclosed in the patent literature 1.

Water droplets c1 received on the partition plate 10 flow leftward in direction indicated by an arrow d and reach the water sprinkling zone 15. Here the droplets c1 fall down through the small holes 15a in the sprinkling zone 15 of the partition plate 10 onto the lower tube group 9b in the range of the air inlet region 16. As shown in FIG. 4(a), a number of water droplets c1 contact the humid gas awhile they are falling, so net heat transmission area for the humid gas a increases. Therefore, effect of cooling the humid gas rises. On the other hand, with the air cooler 02 of the patent literature 1 shown in FIG. 11, droplets 019 received on the tray 021 fall down from the edge of the partition plate 021 directly to the bottom of the cooler 02 to be drained without coming into contact with another heat exchanger tubes 08 below the partition plate 021. This is shown in FIG. 4(b) in comparison with FIG. 4(a).

The water droplets c1 fallen down through the small holes 15a adhere to the outer surface of the heat exchanger tubes 8 of the lower tube group 9b in the air inlet region 16 and form water film c2 thereon as shown in FIG. 5(a). In the air inlet region 16 is flowing humid gas of high temperature and low in relative humidity.

Condensed water generated in the upper heat exchange region 13a and received on the partition plate 10 to be sprinkled through the small holes 15a is cooled on the surfaces of the heat exchanger tubes below dew point and is in a state of super-cooled condition. Therefore, in the air inlet region 16 is performed sensible heat exchange between the water film c2 of super-cooled state and the humid gas introduced to the air inlet region 16. By the sensible heat exchange, temperature of the water film c2 increases, and when the temperature of the water film c2 reaches the dew point, the water film c2 begins to evaporate receiving latent heat of evaporation from the humid gas a, that is, latent heat exchange is performed between the water film c2 and humid gas a.

In this way, sensible heat exchange and latent heat exchange between the humid gas and water film c2 in succession, so heat exchange with high efficiency is performed. Therefore, with the embodiment in which water film c2 is formed on the outer surfaces of heat exchanger tubes, amount of heat exchange between the cooling water r and humid gas a is increased and cooling effect of humid gas can be increased as compared to the heat exchanging method of prior art with which water film c2 is not formed as is shown in FIG. 5(b).

As shown in FIG. 5(a), a ripple c3 is generated on the water film c2 formed by the condensed water on the outer surface of heat exchanger tubes 8 in the air inlet region 16 owing to turbulence a2 generated in a humid gas flow a1 in this air inlet region 16. Due to the formation of the ripple c3, net heat exchange area is increased between the humid gas a and the water film c2, resulting in further increase in heat exchange efficiency.

[The Second Embodiment]

Figure 6:
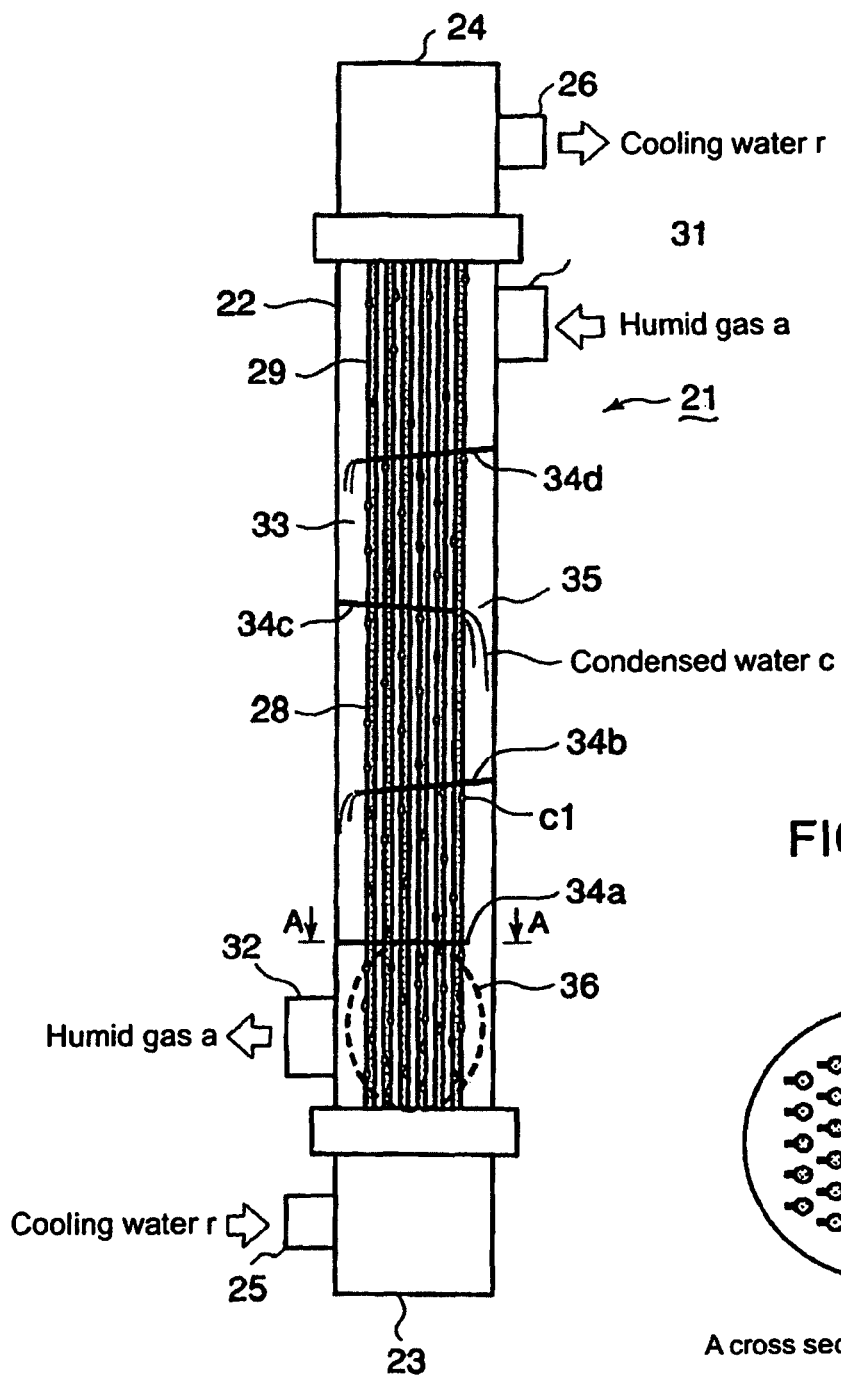
FIG. 6(a) is a humid gas cooler of the second embodiment of the invention represented with heat exchanger tubes revealed.
FIG. 6(b) is a cross section along line A-A in FIG. 6(a).
Figure 6B:
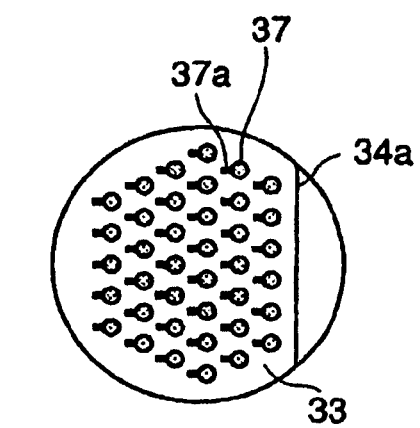

A second embodiment of the present invention will be explained with reference to FIGS. 6(a) and 6(b). FIG. 6(a) is a humid gas cooler of the second embodiment of the invention represented with heat exchanger tubes revealed, and FIG. 6(b) is a cross section along line A-A in FIG. 6(a).

In FIG. 6(a), an air cooler 21 installed in a gas turbine generator, etc. is disposed such that a casing 22 thereof is in upright attitude. To both upper and lower end plates of the casing 22 are attached an upper header 24 and a lower header 23 respectively. A water inlet 25 for introducing cooling water r is provided to the lower header 23, and a cooling water outlet 26 is provided to the upper header 24.

A heat exchanger tube group 29 consisting of a number of heat exchanger tubes 28 is installed in the casing 22 so that both ends of each of the tubes 8 are connected to both end plates of the casing 22. Cooling water r is introduced into the lower header 23 from the water inlet 25, flows upward in the heat exchanger tubes 28 to flow into the upper header 24 to be discharged from the water outlet 26.

Humid gas a is introduced into the casing 22 from an air inlet 31, and flows down in the casing along the heat exchanger tubes 28 to be exhausted from an air outlet 32. Heat exchange is performed between the cooling air r flowing in the heat exchanger tubes 28 and the humid gas r in a heat exchange region 33, then the humid gas a is cooled.

In the heat exchange region 33 are disposed baffle plates 34a~34d so that the humid gas a introduced from the air inlet 31 snakes in the heat exchange region 33. The baffle plates 34b~34d are inclined downward oppositely one after the other and an opening 35 is formed between the downside end of each of the inclined baffle plate 34b~34d so that humid gas a introduced from the air inlet 31 can flow down meandering in the casing 22. The lowest baffle plate 34a is disposed horizontally and the opening 35 is formed in the opposite side to that of the adjacent baffle plate 34b.

As shown in FIG. 6(b), a number of small holes 37a are made in the lowest baffle plate 34a respectively adjacent to holes 37 for the heat exchanger tubes 28 to penetrate respectively. The small holes 37a are for sprinkling condensed water.

Humid gas a is cooled by heat exchange with the cooling water flowing in the heat exchanger tubes 28 in the heat exchange region 33. Moisture in the humid gas condenses when the humid gas is cooled to equal to or below dew point. The condensed water adheres on the surfaces of the heat exchanger tubes 28 in forms of water droplets, and the water droplets gradually grow and fall down by their own gravity. The fallen water droplets c1 are received on each of the baffle plates. Water droplets c1 received on the uppermost baffle plate 34d flow down on the inclined surface thereof and flow down onto the adjacent baffle plate 34c in the form of condensed water c. The condensed water c fallen on the baffle plate 34c flow down on the inclined surface thereof together with water droplets fallen down from the surfaces of the heat exchanger tubes between the baffle plate 34d and 34c through the opening 35. In this way, condensed water c and water droplets c1 fall down sequentially until they fall down onto the lowest baffle plate 34a disposed horizontally.

The condensed water received on the baffle plate 34a flows down through the small holes 37a along the surfaces of the heat exchanger tubes 28. On this occasion, water film c2 as shown in FIG. 5(a) is formed on the surfaces of the heat exchanger tubes 28 in an air outlet region 36 between the lowest baffle plate 34a and the lower end plate of the casing 22. Condensed water c generated in the heat exchange region 33 is cooled to super cooled state when it reaches the air outlet region 36.

Therefore, sensible heat exchange and latent heat exchange are performed consecutively between the super-cooled water film c and humid gas a in like wise as are in the first embodiment, resulting in heat exchange with high efficiency. Therefore, with the embodiment, amount of heat exchange is increased and cooling effect of humid gas can be increased as compared to the heat exchanging method of prior art with which water film c2 is not formed as is shown in FIG. 5(b).

Furthermore, a ripple c3 is formed on the water film owing to turbulence a2 generated in a humid gas flow a1 in the air outlet region 36 as shown in FIG. 5(a). Due to the formation of the ripple c3, contact area of the humid gas a with the water film c2 increases, so net heat transmission area between the humid gas and the water film c2 increases, resulting in further increase in heat transfer efficiency.

[The Third Embodiment]

Figure 7A:
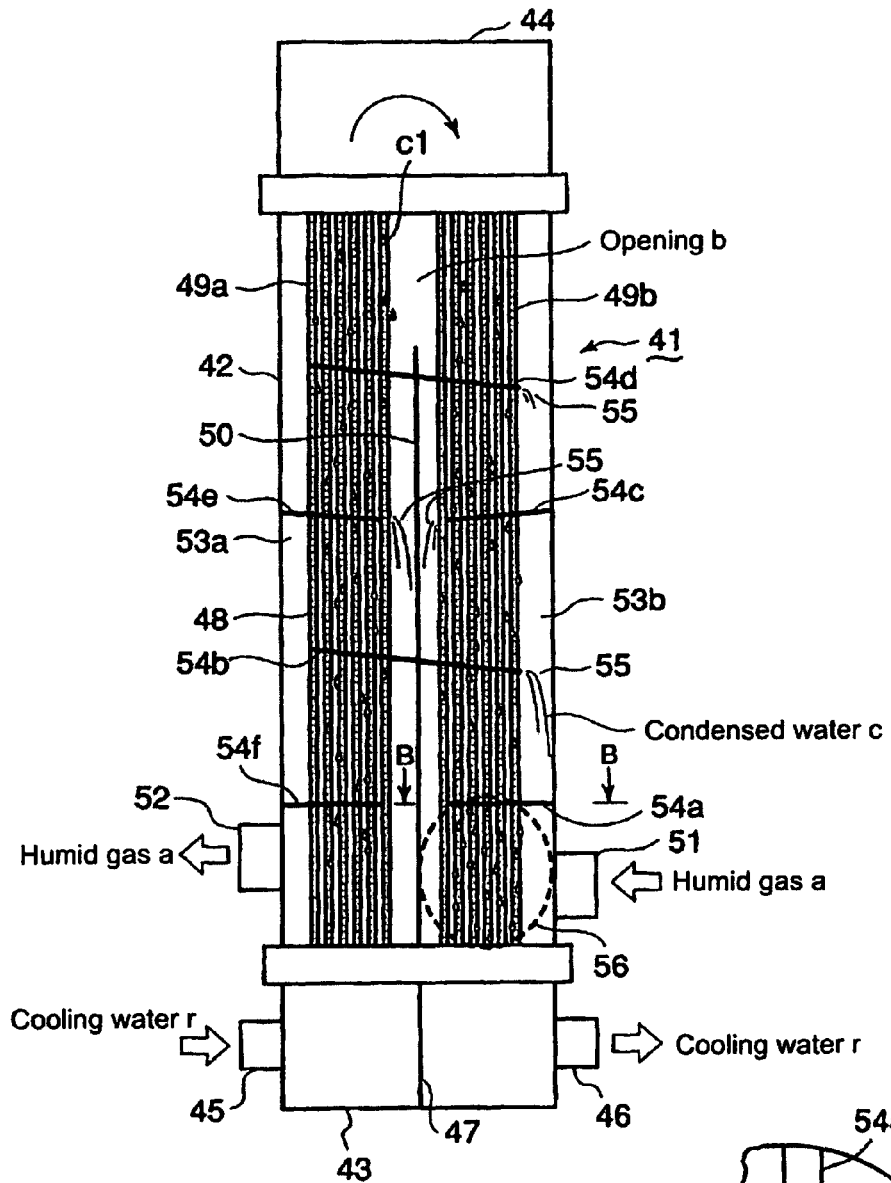
FIG. 7(a) is a humid gas cooler of the third embodiment of the invention represented with heat exchanger tubes revealed.
Figure 7B:
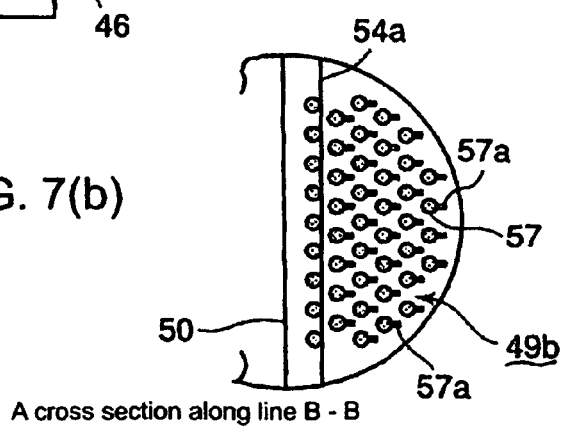
FIG. 7(b) is a cross section along line B-B in FIG. 7(a).

A third embodiment of the present invention will be explained with reference to FIGS. 7(a) and 7(b). FIG. 7(a) is a humid gas cooler of the third embodiment of the invention represented with heat exchanger tubes revealed, and FIG. 7(b) is a cross section along line B-B in FIG. 7(a).

In FIG. 7(a), an air cooler 41 installed in a gas turbine generator, etc. is disposed such that a casing 42 thereof is in upright attitude. To both the upper and lower end plates of the casing 42 are attached an upper header 44 and a lower header 43 respectively. Inside the lower header 43 is divided by a partition plate 47 into a left room and a right room. A cooling water inlet 45 and a cooling water outlet 46 are provided respectively to the left and right room of the left header 43.

A number of heat exchanger tubes 48 are arrange upright in the casing 42 between its lower and upper end plates to which the lower and upper headers are attached respectively. Inside the casing 42 is divided by a partition plate 50 into a left heat exchange region 53a where a left heat exchanger tube group 49a consisting of a plurality of heat exchanger tubes 48 is accommodated and a right heat exchange region 53b where a right heat exchanger tube group 49b consisting of a plurality of heat exchanger tubes 48 is accommodated. The upper end of the partition plate does not reach the upper end plate of the casing 42 so that an opening b is formed between the upper end of the partition plate 50 and upper end plate of the casing 42.

Cooling water r is introduced to the left room of the lower header 43 from the cooling water inlet 45, flows up in the heat exchanger tubes of left tube group 49a to the upper header 44, from there the cooling water r flows down in the in the heat exchanger tubes of right tube group 49b to the right room of the lower header 43 to be drained from the cooling water outlet 46.

Humid gas a is introduced from an air inlet 51 at a lower right part of the casing 43, flows up in the right heat exchange region 53b along the right heat exchanger tube group 49b, enters the left heat exchange region 53a through the opening b, and flows down in the left heat exchange region 53a along the left heat exchanger tube group 49a to be discharged from an air outlet 52 connected to the casing 42 at a lower left part thereof. The humid gas r introduced into the casing 42 from the air inlet 51 is cooled in the right and left heat exchange regions 53a and 53b.

Baffle plates 54a~54f are provided in the casing so that the humid gas a introduced from the air inlet 51 snakes in the left and right heat exchange regions 53b and 53a. The baffle plate 54a is provided in the right heat exchange region 53b slightly above the air inlet 51.

As shown in FIG. 7(b), in the baffle plate 54a are made small holes 57a for sprinkling condensed water adjacent respectively to holes 57 for allowing the heat exchanger tubes 48 to penetrate the plate respectively.

Humid gas a is cooled by heat exchange with the cooling water flowing in the heat exchanger tubes 48 in the right and left heat exchange region 53b and 53a. When the humid gas is cooled to dew point temperature thereof or lower, moisture contained therein condenses on the surfaces of the heat exchanger tubes 48. Water condensed on the surface of the tubes grows to water droplets c1, which fall down from the surface of the tubes.

The fallen water droplets c1 are received on each of the baffle plates 54a~54e.

Among these baffle plate, baffle plates 54b~54e are inclined so that water droplets received thereon flow down the surface of each baffle plate to fall down as condensed water through each of openings 55. The condensed water is lastly received on the baffle plate 54a. In the baffle plate 54b and 54d is provided an opening not shown in the drawing respectively adjacent the partition plate 50 to allow the condensed water c to fall down through.

As shown in FIG. 7(b), small holes 57a are made in the partition plate 54a adjacent respectively to holes 57 for the heat exchanger tubes 48 to penetrate in order to allow condensed water c gathered on the partition plate 54a to fall down.

The condensed water c flows down from the small holes 57a along the surfaces of heat exchanger tubes 48 of the right tube group 49b below the partition plate 54a, and condensed water film c2 as shown in FIG. 5(a) is formed on the surfaces of the heat exchange tubes 48 in an air inlet region 56. Humid gas high in temperature and low in relative humidity is introduced in the air inlet region 56, and condensed water which flows down through the small holes 57a into the air inlet region 56, becomes supper-cooled state.

Therefore, sensible heat exchange and latent heat exchange are performed consecutively between the super-cooled water film and humid gas as are performed in the first embodiment, so heat exchange with high efficiency is performed. Accordingly, amount of heat exchange increases as compared with prior art in which the water film c2 is not formed on heat exchanger tubes as is shown in FIG. 5(b), and cooling effect of humid gas can be increased.

Furthermore, a ripple c3 is formed on the water film c2 owing to turbulence a2 generated in a humid gas flow a1 in the air inlet region 56 as shown in FIG. 5(a). Due to the formation of the ripple c3, contact area of the humid gas a with the water film c2 increases, and net heat transmission area between the humid gas and the water film c2 increases, resulting in further increase in heat transfer efficiency.

[The Fourth Embodiment]

Figure 8:
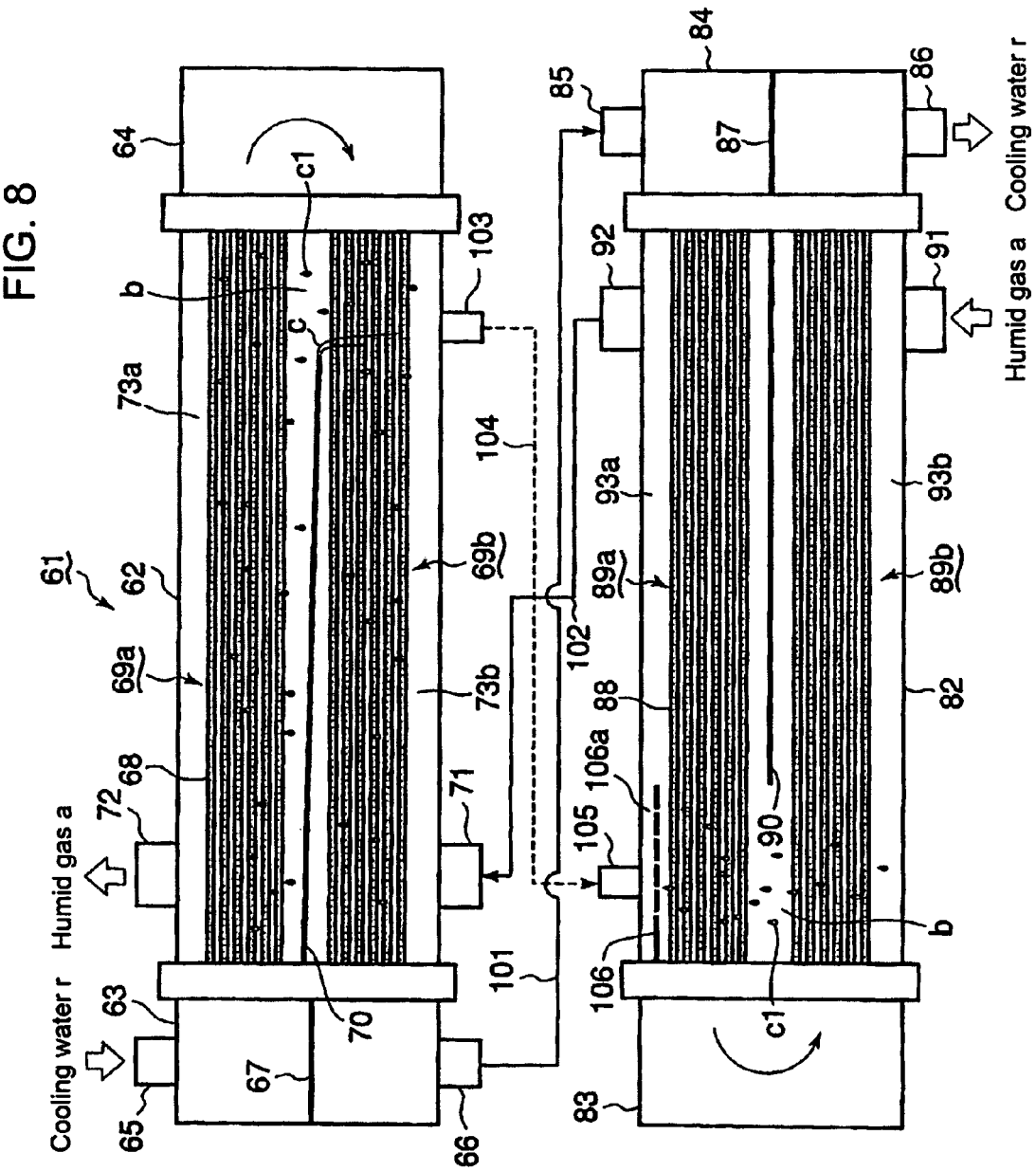
FIG. 8 is a humid gas cooler of the fourth embodiment of the invention represented with heat exchanger tubes revealed.

A fourth embodiment of the present invention will be explained with reference to FIG. 8. FIG. 8 is a humid gas cooler of the fourth embodiment of the invention represented with heat exchanger tubes revealed.

Referring to FIG. 8, an air cooler 61 of this embodiment is composed of two set of air coolers, one consists of a casing 62, heat exchanger tubes 68, and left and right headers 63 and 64, the other consists of a casing 82, heat exchanger tubes 88, and left and right headers 83 and 84. The casings 62 and 82 are disposed horizontally, the casing 62 above the casing 82.

Both left and right headers 63 and 64 are attached to both end plates of the casing 62. Inside of the casing 62 is divided by a partition plate 70 into an upper heat exchange region 73a where heat exchanger tubes 68 of upper tube group 69a are accommodated, and a lower heat exchange region 73b where heat exchanger tubes 68 of lower tube group 69b are accommodated. The heat exchanger tubes 68 are arranged horizontally between the left and right end plates of the casing 62. The partition plate 70 is inclined rightward and the right end thereof does not reach the right end plate of the casing 62 so that an opening b is formed between the upper heat exchange region 73a and the lower heat exchange region 73b. Inside of the left header 63 is divided in an upper room and a lower room by a partition plate 67.

Cooling water r is introduced from a cooling water inlet 65 into the upper room of the left header 63, flows in the heat exchanger tubes of the upper tube group 69a to the right header 64, and from there flows in the heat exchanger tubes of the lower tube group 69b into the lower room of the left header 63 to be discharged from a cooling water outlet 66.

Both left and right headers 83 and 84 are attached to both end plates of the casing 82. Inside of the casing 82 is divided by a partition plate 90 into an upper heat exchange region 93a where heat exchanger tubes 88 of upper tube group 89a are accommodated and a lower heat exchange region 93b where heat exchanger tubes 88 of lower tube group 89b are accommodated. The heat exchanger tubes 88 are arranged horizontally between the left and right end plates of the casing 82. The partition plate 90 is inclined leftward and the left end thereof does not reach the left end plate of the casing 82 so that an opening b is formed between them. Inside of the right header 84 is divided in an upper room and a lower room by a partition plate 87.

Cooling water r discharged from the lower room of the left header from the water outlet 66 is introduced into the upper room of the right header 84 of the casing 82 via a connecting pipe 101, then flows in the heat exchanger tubes of the upper tube group 89a to the left header 83, from there flows in the heat exchanger tubes of the lower tube group 89b into the lower room of the right header 84 to be drained from a cooling water outlet 86.

Humid gas a is introduced into the lower heat exchange region 93b of the casing 82 from an air inlet 91 provided at a lower part near the right end plate thereof, flows leftward along the heat exchanger tubes 88 of the lower tube group 89b while exchanging heat with the cooling water flowing therein, passes the opening b and enters the upper heat exchange region 93a to flow rightward therein along the heat exchanger tubes 88 of the upper tube group 89a while exchanging heat with the cooling water flowing therein, and is discharged from an air outlet 92 provided at an upper part near the right end plate of the casing 82. The humid gas a discharged from the air outlet 92 flows to an air inlet 71 provided to the casing 62 at a lower part near the left end plate of the casing 62 via a connecting pipe 102 to be introduced into the lower heat exchange region 73b of the casing 62. The humid gas a then flows in the lower heat exchange region 73b rightward to reach the opening b while exchanging heat with the cooling water r flowing in the heat exchanger tubes 68 of the lower tube group 69b, then passes the opening b and enters the upper heat exchange region 73a to flow leftward therein while exchanging heat with the cooling water r flowing in the heat exchanger tubes 68 of the lower tube group 69b to be discharged from an air outlet 72 provided to the casing 62 at an upper part near the left endplate thereof.

When the humid gas is cooled by the cooling water r to dew point temperature or lower, moisture in the humid gas condenses. Condensed water generated in the upper heat exchange region 73a on the surfaces of the heat exchanger tubes of the upper tube group 69a, fall down as water droplets c1. The partition plate 70 is inclined to the right, so condensed water c received on the partition plate 70 flows thereon to the right and fall down through the opening b formed between the right end thereof and the right end plate of the casing 62 and flow out from a condensed water outlet 103 provided to the casing 62 at the bottom thereof below the opening b. Condensed water generated in the lower heat exchange region 73b condenses on the surfaces of the heat exchanger tubes of the lower tube group 69b falls down as water droplets to the bottom of the casing 62 and flow out from the condensed water outlet 103 too.

The condensed water c flown out from the condensed water outlet 103 is introduced via a connecting pipe 104 into the casing 82 from a condensed water inlet 105 provided to the casing 82 at the top thereof near left end plate thereof. Below the condensed water inlet 105 is provided a tray 106 having a number of small holes for sprinkling the condensed water introduced into the casing 82. The condensed water is sprinkled on the tray 106a of the heat exchanger tubes 88 of the upper tube group 89a and lower tube group 89b in a zone under the tray 106.

In this way, condensed water c generated in the casing 62 is gathered and introduced into the casing 82, during which the condensed water is super-cooled to lower temperature than dew point. The super-cooled condensed water is sprinkled onto the heat exchanger tubes 88 of the upper and lower tube groups 89a and 89b, and condensed water film c2 is formed on the surfaces of the heat exchanger tubes 88 as show in FIG. 5(a).

This condensed water sprinkled region in the casing 82 is relatively near to the air inlet 91 from which humid gas is introduced into the casing 82, so the humid gas flowing in this region is still high in temperature and low in relative humidity.

Therefore, sensible heat exchange and latent heat exchange are performed between the water film c2 and humid gas consecutively as are in the first to third embodiment, so heat exchange of high efficiency is performed.

Furthermore, a ripple c3 is formed on the water film c2 formed on the surfaces of the heat exchanger tubes 88 in the region under the tray 106 owing to turbulence a2 generated in a humid gas flow in the region as shown in FIG. 5(a). Due to the formation of the ripple c3, heat exchange area between the humid gas and the cooling liquid increases, resulting in further increase in heat transfer efficiency.

[The Fifth Embodiment]

Figure 9:
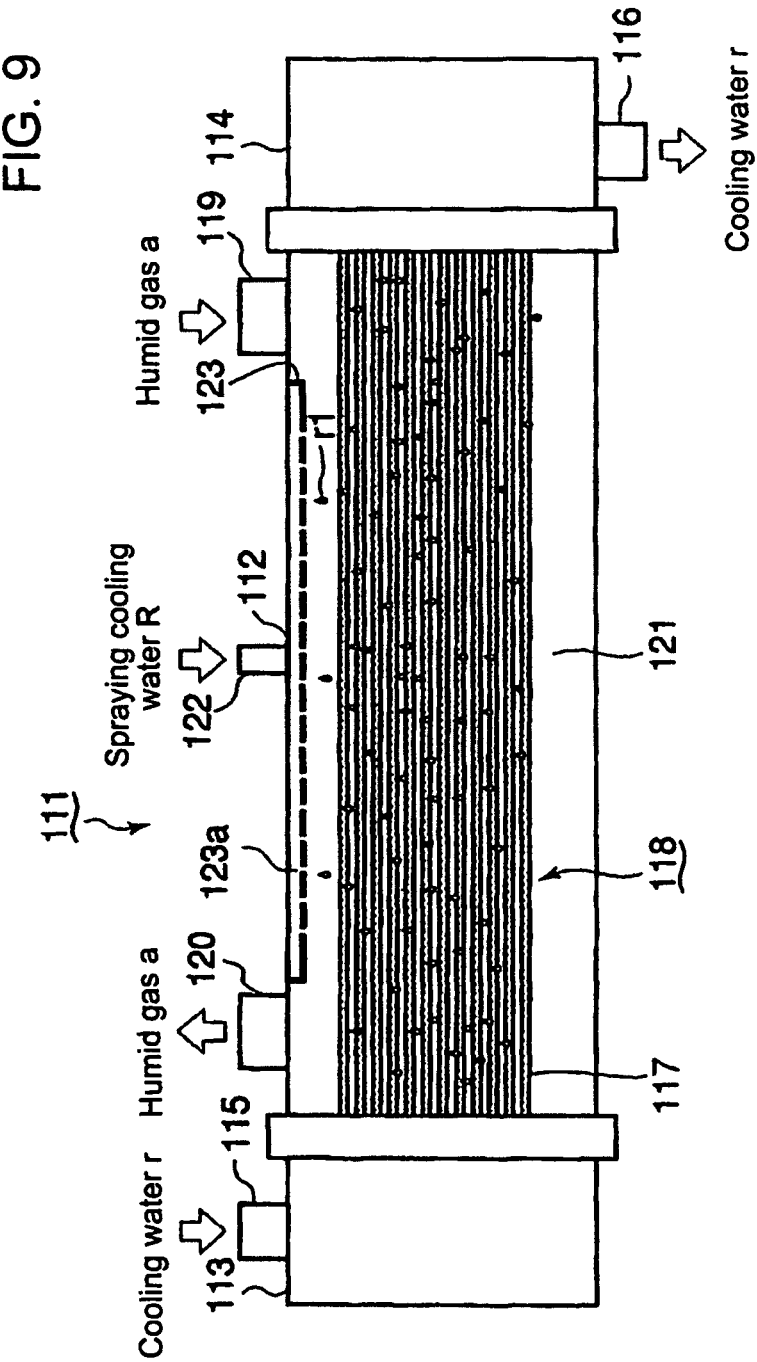
FIG. 9 is a humid gas cooler of the fifth embodiment of the invention represented with heat exchanger tubes revealed.

A fifth embodiment of the present invention will be explained with reference to FIG. 9. FIG. 9 is an elevation view showing a humid gas cooler of the fifth embodiment of the invention represented with heat exchanger tubes revealed.

Referring to FIG. 9, an air cooler 111 includes a casing 112 disposed horizontally having both left and right end plates to which a left header 113 and a right header 114 are attached, and a number of heat exchanger tubes 117 composing a tube group 118 arranged in the casing 112 between both the end plates thereof. Cooling water r is introduced into the left header 113 through a water inlet 115 provided on top thereof, then flows in the heat exchanger tubes 117 to reach the right header 114 to be drained from a water outlet 116 provided at the bottom of the right header 114.

Humid gas a is introduced into the casing 112 through an air inlet 119 provided near the right end plate of the casing 112 at the top thereof, flows leftward along the heat exchanger tubes 117, and discharged from an air outlet 120 provided near the left end plate of the casing 112 at the top thereof. Heat exchange between cooling water r and humid gas a is performed in a heat exchange region 121 to cool the humid gas a. An inlet 122 for introducing spraying cooling water R is provided at the top center part of the casing 112. A tray 123 is attached to the casing 112 inside thereof below the inlet 122 of cooling water R to receive the cooling water R. The tray 123 extends horizontally near to both the air inlet 119 and air outlet 120 and has a number of small holes 123a for sprinkling the cooling water R on the heat exchanger tubes 117.

The cooling water R introduced from the water inlet 122 and received on the tray 123 is sprinkled through the small holes 123a on the heat exchanger tube group 118. The cooling water R sprinkled on the tube group 118 falls down as water droplets r1, and forms a water film c2 on the surfaces of the heat exchanger tubes 117 as shown in FIG. 5(a).

According to the embodiment, cooling water R can be sprinkled on the heat exchanger tubes 117 over a wide range via the tray 123 extending horizontally near to both the end plates of the casing 112. Furthermore, as the cooling water R is supplied from a separate water supply source not utilizing the condensed water generated in the air cooler from moisture contained in humid gas, quantity and temperature of the cooling water R can be controlled freely. Therefore, it is possible to increase capacity of cooling humid gas by introducing the cooling water R of low temperature in a large amount. By allowing formation of cooling water film c2 on the surfaces of the heat exchanger tubes 117, efficiency of heat transfer between cooling water and humid gas is increased, and further, by allowing a ripple c3 to be generated on the surface of the water film c2, net heat transmission area is increased resulting in further increase in efficiency of heat transfer.

Figure 10:
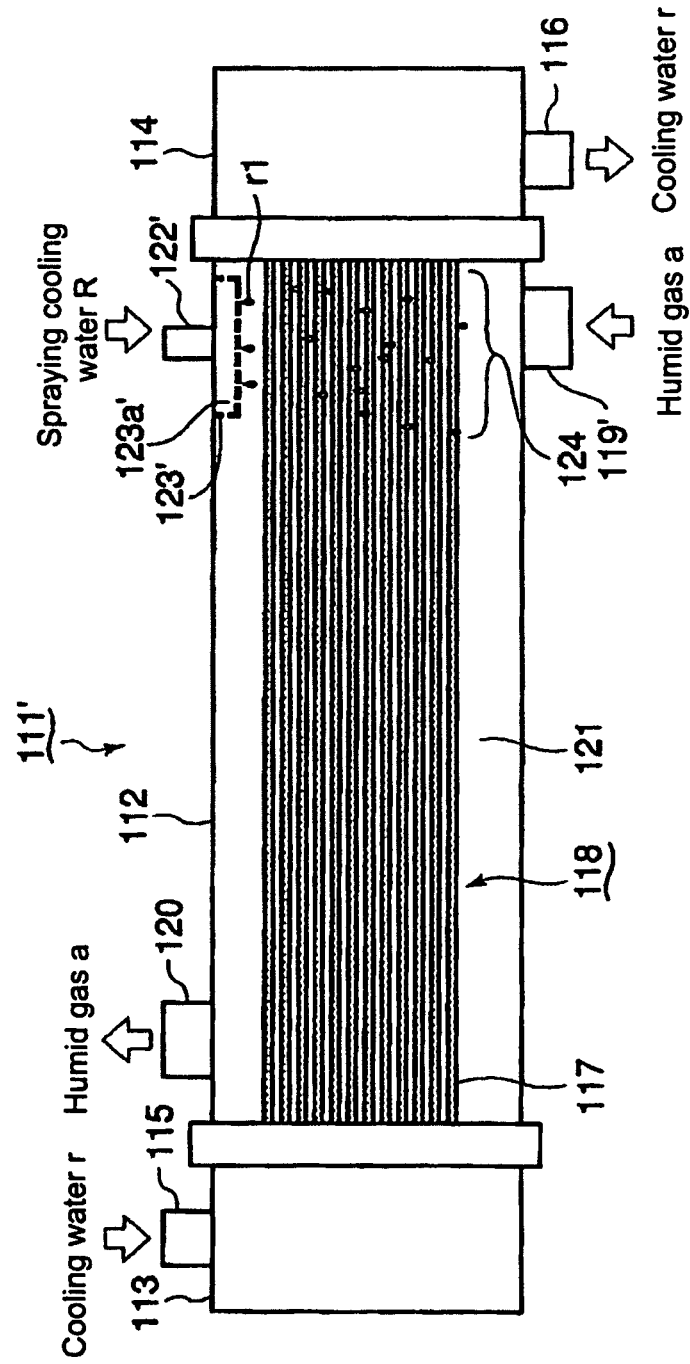
FIG. 10 is a modification of humid gas cooler of the fifth embodiment of the invention represented with heat exchanger tubes revealed.

FIG. 10 is a modification of humid gas cooler of the fifth embodiment represented with heat exchanger tubes revealed.

Referring to FIG. 10, in this modified air cooler 111', a humid gas inlet 119' is provided at the bottom of the casing 112 near the right end plate thereof, and an inlet 122' for introducing water R for sprinkling is provided at the top of the casing 112 near the right end plate thereof. A tray 123' for sprinkling water is attached to the casing 112 inside thereof below the inlet 122' of cooling water R to receive the cooling water R to be sprinkled. The tray 123' has a number of small halls 123a' for allowing the cooling water R to be sprinkled and extends to cover only an air inlet region 124 adjacent the right end plate of the casing 112. Except the points mentioned above, the cooler 111' is constructed similar to the cooler 111 of the fifth embodiment, constituent parts similar to those of the fifth embodiment are designated by the same reference numerals, and explanation is omitted.

In this modification, the cooling water R is sprinkled on the air inlet region 124 restricted to an inside space above the air inlet 119' adjacent the right end plate thereof in the casing 112.

In the air inlet region 124 flows humid gas high in temperature and low in relative humidity, efficiency of heat transfer can be increased by sprinkling the cooling water R on the part of the heat exchange tubes 117 in the air inlet region 124. As cooling water R is sprinkled on the air inlet region 124, a range limited above the humid gas inlet 119', amount of cooling water R used can be saved.

According to the present invention, cooling performance of a humid gas cooler used in gas turbine power generation plant or compound power plant with coal gasification equipment can be improved with simple construction without need for of complicated processes.

The invention claimed is:

1. A heat exchanger for cooling humid gas comprising:
    a casing having a gas inlet on a lower part of the casing and a gas outlet on an upper part of the casing;
    a partition plate which divides an interior of the casing into an upper heat exchange space communicated with the gas outlet and a lower heat exchange space communicated with the gas inlet and which has an opening through which the upper heat exchange space is communicated with the lower heat exchange space, the partition plate being configured to direct the humid gas that flows into the lower heat exchange space via the gas inlet to pass through the lower heat exchange space, the opening and the upper heat exchange space toward the gas outlet; and
    heat exchanger tubes which are arranged to horizontally extend in each of the upper heat exchange space and the lower heat exchange space and in which cooling liquid flows so as to cool the humid gas through heat exchange between the humid gas flowing in the casing and the cooling liquid, the heat exchanger tubes having a first region in the lower heat exchange space and a second region in the upper heat exchange space,
    wherein the partition plate includes holes above the first region of the heat exchanger tubes at a horizontal position where the gas inlet is located,
    wherein the partition plate is configured to receive condensed liquid generated by condensation of moisture in the humid gas having been cooled by heat exchange with the second region of the heat exchanger tubes above the partition plate and to supply the condensed liquid to the first region of the heat exchanger tubes via the holes;
    wherein the partition plate is inclined downward in a direction opposite to flow of the humid gas in the lower heat exchange space and configured to direct the condensed liquid received by the partition plate toward the holes at the horizontal position.

2. A heat exchanger for cooling humid gas according to claim 1, further comprising:
    a header disposed at an end of the casing on a side opposite to the opening, the first region and the second region of the heat exchange tubes being communicated with each other through the header,
    wherein the partition plate is disposed above the first region and below the second region, the partition plate being inclined with respect to a horizontal direction.

3. A heat exchanger according to claim 1, wherein the heat exchanger tubes extend along the flow path, and the cooling liquid flows inside the heat exchanger tubes in a direction opposite to a flow direction of the humid gas in the flow path.

* * * * *